United States Patent
Oishi

(10) Patent No.: US 9,066,100 B2
(45) Date of Patent: *Jun. 23, 2015

(54) IMAGE CODING APPARATUS AND IMAGE CODING METHOD

(75) Inventor: Akihiro Oishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/602,561

(22) Filed: Sep. 4, 2012

(65) Prior Publication Data

US 2012/0328006 A1 Dec. 27, 2012

Related U.S. Application Data

(63) Continuation of application No. 11/682,859, filed on Mar. 6, 2007, now Pat. No. 8,270,481.

(30) Foreign Application Priority Data

Mar. 10, 2006 (JP) .................................. 2006-066092
Dec. 19, 2006 (JP) .................................. 2006-341406

(51) Int. Cl.
*H04N 11/04* (2006.01)
*H04N 19/136* (2014.01)
*H04N 19/103* (2014.01)
*H04N 19/107* (2014.01)

(52) U.S. Cl.
CPC ........... *H04N 19/136* (2014.11); *H04N 19/103* (2014.11); *H04N 19/107* (2014.11)

(58) Field of Classification Search
CPC .................................................. H04N 19/136
USPC ................. 375/240.03, 240.01, 240.1, 240.13
See application file for complete search history.

(56) References Cited

U.S. PATENT DOCUMENTS 4,984,076 A * 1/1991 Watanabe et al. .......... 375/240.2
5,703,644 A * 12/1997 Mori et al. .................... 348/363

(Continued)

FOREIGN PATENT DOCUMENTS

| JP | 11-196422 A | 7/1999 |
| JP | 2002-010259 A | 1/2002 |
| JP | 2003-250159 A | 9/2003 |

OTHER PUBLICATIONS

Wen et al, Modeling and Detection of Blurred Illumination Edges, 2010, Fourth-Rim Symposium on Image and Video Technology, pp. 276-281.*

(Continued)

*Primary Examiner* — Luu Pham
*Assistant Examiner* — Jenise Jackson
(74) *Attorney, Agent, or Firm* — Canon U.S.A., Inc. IP Division

(57) ABSTRACT

At least one exemplary embodiment is directed to an image coding apparatus configured to encode moving image data including: a coding unit configured to encode each picture in the moving image data in a unit of a first block; a luminance change detection unit configured to divide the moving image data into a plurality of second blocks and to detect a luminance change block in which a luminance change occurred from the plurality of the second blocks in one picture; and a code amount adjustment unit configured to increase an amount of code allocated to the first block if the first block corresponds to the luminance change block detected by the luminance change detection unit.

24 Claims, 6 Drawing Sheets

(56) References Cited

U.S. PATENT DOCUMENTS

| | | | |
|---|---|---|---|
| RE37,091 E * | 3/2001 | Tanaka et al. | 348/409.1 |
| 6,449,015 B1 * | 9/2002 | Sugaya | 348/459 |
| 6,587,590 B1 * | 7/2003 | Pan | 382/250 |
| 6,618,444 B1 * | 9/2003 | Haskell et al. | 375/240.24 |
| 6,907,069 B2 | 6/2005 | Matsuzaki et al. | |
| 7,340,767 B2 * | 3/2008 | Kikuchi et al. | 725/105 |
| 7,944,973 B2 * | 5/2011 | Chujoh et al. | 375/240.16 |
| 2001/0019364 A1 * | 9/2001 | Kawahara | 348/362 |
| 2001/0036229 A1 * | 11/2001 | Chen et al. | 375/240.08 |
| 2001/0055337 A1 | 12/2001 | Matsuzaki et al. | |
| 2002/0196849 A1 * | 12/2002 | Kamikura et al. | 375/240.08 |
| 2003/0108099 A1 * | 6/2003 | Nagumo et al. | 375/240 |
| 2003/0142750 A1 * | 7/2003 | Oguz et al. | 375/240.18 |
| 2003/0206593 A1 * | 11/2003 | Srinivasan et al. | 375/240.16 |
| 2004/0151243 A1 * | 8/2004 | Bhaskaran et al. | 375/240.03 |
| 2005/0078748 A1 * | 4/2005 | Moni et al. | 375/240.03 |
| 2006/0007238 A1 * | 1/2006 | Yamamoto | 345/589 |
| 2006/0209018 A1 * | 9/2006 | Watanabe et al. | 345/156 |
| 2007/0025718 A1 * | 2/2007 | Mori et al. | 396/155 |
| 2007/0189748 A1 * | 8/2007 | Drimbarean et al. | 396/89 |
| 2007/0192782 A1 * | 8/2007 | Ramaswamy | 725/9 |
| 2007/0201756 A1 * | 8/2007 | Murakami | 382/251 |
| 2008/0123971 A1 * | 5/2008 | Fukuzawa | 382/232 |
| 2008/0130744 A1 * | 6/2008 | Huang et al. | 375/240.08 |

OTHER PUBLICATIONS

Bertagnolli et al, Open Loop Transcoding Using Perceptually Adaptive Requantization of DCT Coefficients, Jul. 6, 2009, ACM, pp. 1-6.*

Lee et al, Image Gradient Detection with Hough Transform, 2008, IEEE, pp. 753-756.*

Efros et al, Image Quilting for Texture Syntesis and Transfer, Aug. 17, 2001, ACM, pp. 341-346.*

Zana et al, Face Recognition Based on Polar Frequency Features, Jan. 1, 2006, ACM, vol. 3, No. 1, pp. 62-82.*

* cited by examiner

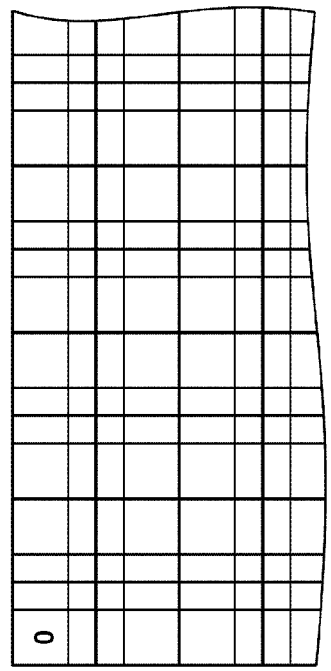

IMAGE CODING APPARATUS AND IMAGE CODING METHOD

CROSS REFERENCE TO RELATED APPLICATIONS

This application is a continuation application of co-pending application Ser. No. 11/682,859 filed on Mar. 6, 2007 which claims priority from Japanese Patent Application Nos. 2006-066092 filed Mar. 10, 2006 and 2006-341406 filed Dec. 19, 2006, the contents of which are hereby incorporated by reference herein in their entirety.

BACKGROUND OF THE INVENTION

1. Field of the Invention

The present invention relates to an image coding apparatus and an image coding method. More specifically, the present invention relates to, for example, a method suitable for control of coding of a picture when a flash unit emits light.

2. Description of the Related Art

Conventionally, a Moving Picture Experts Group (MPEG) coding method performs intra coding and inter coding. In the intra coding, information within a picture is used. In the inter coding, an inter-picture difference is used. In the inter coding, a difference between a picture to be encoded and a reference picture is encoded.

In coding processing, a code amount allocated to a picture is determined based on a given rate, and further, an amount of target code provided to one macroblock is computed based on the determined code amount. Based on the amount of target code provided to the macroblock, a quantization coefficient is determined, and quantization is performed based on the determined quantization coefficient (see Japanese Patent Application Laid-Open No. 2003-102007).

An imaging apparatus mounted with an MPEG coder-decoder (MPEG codec) is already in the market. In connection with the apparatus, Japanese Patent Application Laid-Open No. 2001-025011 discusses a method of controlling of coding according to information of a shutter speed.

However, in the above conventional methods, for example, coding control is not described which is suitable for taking a picture when a flash unit emits light.

For example, in the case of using an MPEG codec in an imaging apparatus, a flashing unit for shooting a still image can flash during shooting of a moving image. In addition, during shooting of a moving image, a flashing unit of another camera, which is shooting the same object, can emit light at the same time. In these cases, a rapid luminance change of the photographed object occurs.

Therefore, in encoding a video signal obtained by shooting the object, the video signal can be adversely affected by the flashing of a flash unit. More specifically, an encoding device cannot appropriately respond to the luminance change of a video image for a certain length of time when the rapid luminance change has arisen due to the flashing. Accordingly, an efficiency of coding is lowered, and an image quality deteriorates.

SUMMARY OF THE INVENTION

The present invention provides an image coding apparatus and an image coding method capable of alleviating or reducing degradation of an image quality in coding even when image data to be encoded includes a picture whose luminance is rapidly changed, for example, due to a flashing of a flash unit.

According to an aspect of the present invention, an image coding apparatus configured to encode moving image data, includes: a coding unit configured to encode each picture in the moving image data in a unit of a first block; a luminance change detection unit configured to divide the moving image data into a plurality of second blocks and to detect a luminance change block in which a luminance change occurred from the plurality of the second blocks in one picture; and a code amount adjustment unit configured to increase an amount of code allocated to the first block if the first block corresponds to the luminance change block detected by the luminance change detection unit.

According to another aspect of the present invention, an image coding method for encoding moving image data includes: encoding each picture in the moving image data in a unit of a first block; dividing the moving image data into a plurality of second blocks; detecting a luminance change block in which a luminance change occurred from the plurality of the second blocks in one picture; and increasing an amount of code allocated to the first block if the first block corresponds to the luminance change block.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 6A illustrates an arrangement of flash detection blocks according to the first exemplary embodiment of the present invention.

FIG. 6B illustrates an arrangement of macroblocks according to the first exemplary embodiment of the present invention.

FIG. 6C illustrates a result obtained by overlapping an example illustrated in FIG. 6B onto an example illustrated in FIG. 6A according to the first exemplary embodiment of the present invention.

DETAILED DESCRIPTION OF THE EXEMPLARY EMBODIMENTS

Various exemplary embodiments of the present invention will now be described in detail with reference to the drawings.

It should be noted that the relative arrangement of the components, the numerical expressions, and numerical values set forth in these embodiments do not limit the scope of the present invention unless it is specifically stated otherwise.

First Exemplary Embodiment

Figure 1:
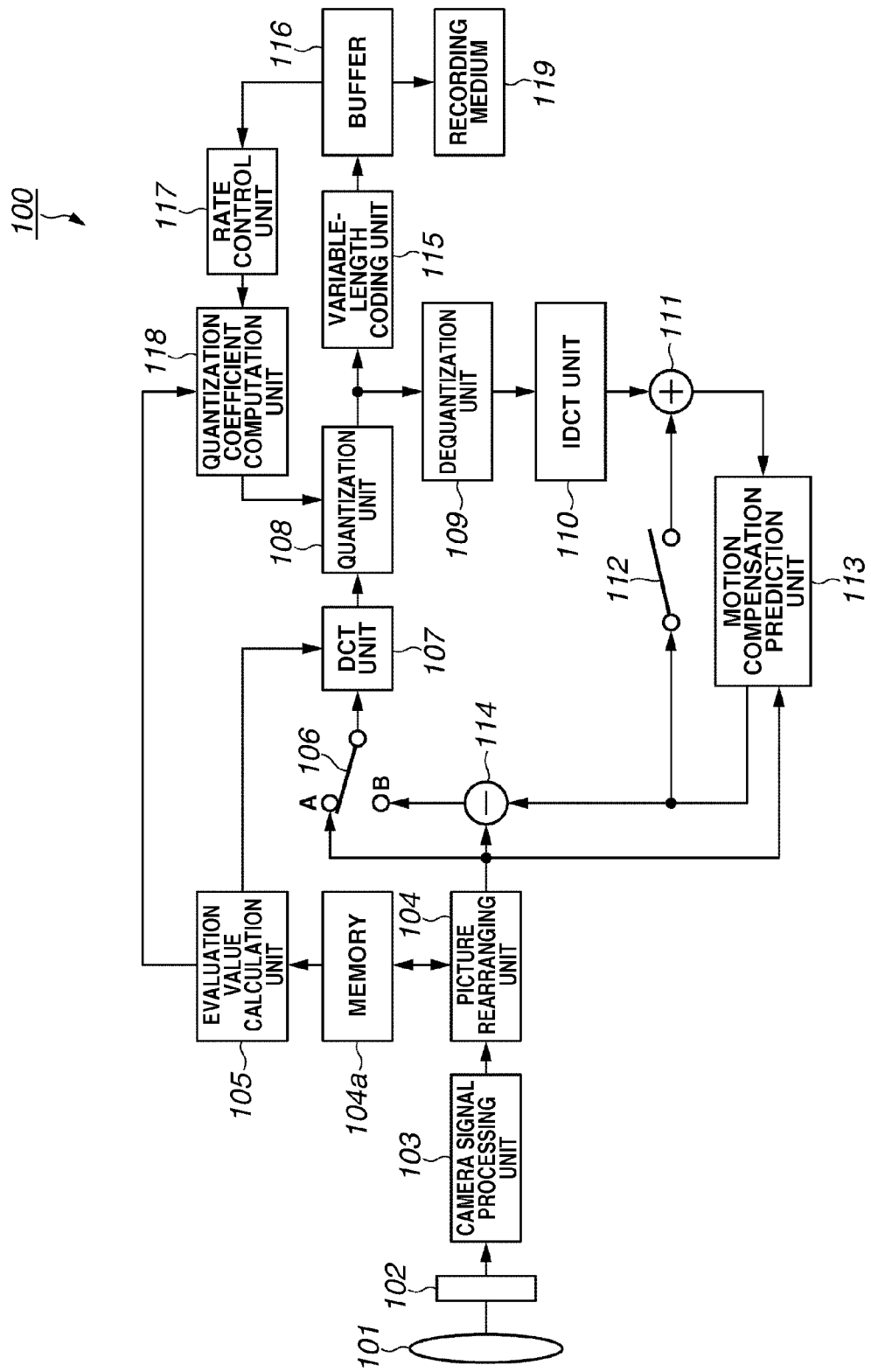
FIG. 1 is a block diagram illustrating an exemplary configuration of a camcorder according to a first exemplary embodiment of the present invention.

FIG. 1 illustrates an exemplary configuration of a camcorder 100 according to an exemplary embodiment of the present invention. The camcoder 100 has a configuration and a function as an image coding apparatus. In FIG. 1, a description is omitted concerning a flash unit and a shutter related to shooting of a still image, a microphone unit related to audio processing, and a configuration of an audio signal processing unit.

Referring to FIG. 1, the camcoder 100 includes a lens 101, an image pickup device 102, a camera signal processing unit 103, a picture rearranging unit 104, and a memory 104a. Further, the camcoder 100 includes an evaluation value calculation unit 105, a first switch 106, an orthogonal transform unit 107 which uses, for example, a discrete cosine transform (DCT) (hereinafter referred to as a "DCT unit"), and a quantization unit 108. Moreover, the camcoder 100 includes a dequantization unit 109, an inverse orthogonal transform unit 110 which uses, for example, an inverse discrete cosine transform (IDCT) (hereinafter referred to as an "IDCT unit"), an adder 111, a second switch 112, and a motion compensation prediction unit 113. In addition, the camcoder 100 includes a subtracter 114, a variable-length coding unit 115, a buffer 116, a rate control unit 117, a quantization coefficient computation unit 118, and a recording medium 119.

Moving image coding performed by the camcoder 100 includes two types of coding, namely, intra coding and inter coding. Intra coding is performed using only data in the same picture. Inter coding is performed while making an inter-picture prediction.

A picture generated by coding includes an I picture, a P picture, and a B picture. The I picture is generated by intra-coding of all data in the same picture. The P picture includes a forward inter-picture prediction. The B picture includes forward and backward inter-picture predictions. Pictures from an I picture to a picture before a next I picture are called a "group of pictures" (GOP). In the following description, as an example, coding is performed frame by frame.

Now, an operation according to the present exemplary embodiment is described with reference to FIG. 1.

An object image that has passed through the lens 101 is converted into an image signal in a unit of one field or one frame by the image pick-up device, and then input into the camera signal processing unit 103. The camera signal processing unit 103 digitizes the input image signal, determines a correction value using the digitized image signal, and then generates image data by correcting the input image signal. Then, the camera signal processing unit 103 divides the generated data into a color-difference signal and a luminance signal, to supply the image data to the picture rearranging unit 104 in the unit of one frame.

The picture rearranging unit 104 has the memory 104a, which is capable of storing a plurality of frames, and outputs the frames by rearranging a sequence of input frames. When frames are serially input into the picture rearranging unit 104 in order of a first frame, a second frame, a third frame, and so forth, the picture rearranging unit 104 rearranges the frames considering an order of coding, and outputs the frames, for example, in order of a third frame, a first frame, a second frame, and so forth. Further, the evaluation value calculation unit 105, using image data stored in the memory 104a, detects an image block in which a rapid luminance change has occurred. The rapid luminance change occurs, for example, when the image block is subjected to a flashing by a flash unit. In the present exemplary embodiment, it is assumed that the image block where rapid luminance change is detected (hereinafter referred to as a flash detection block), includes 24×24 pixels.

Figure 2:
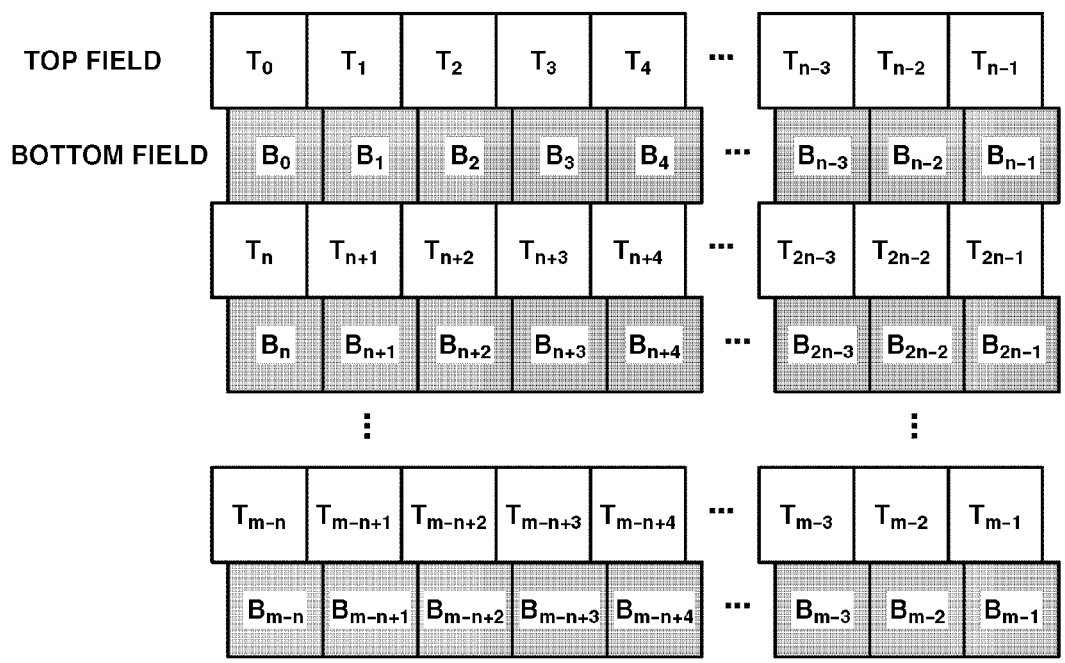
FIG. 2 illustrates a pixel block whose evaluation value is computed, and an equation used for computing an evaluation value according to the first exemplary embodiment of the present invention.

FIG. 2 illustrates a pixel block whose evaluation value is computed, and an equation used for computing an evaluation value. Per frame stored in the memory 104a, the evaluation value calculation unit 105 computes a sum A of differential absolute values between a total of a pixel value in a top field and a total of a pixel value in a bottom field, based on the equation shown in FIG. 2 so that a luminance change can be determined. For example, in the case of a frame subjected to a flash, only one side of fields is affected by the flash, and accordingly, total values of each field considerably differ. The evaluation value calculation unit 105 computes the evaluation value per flash detection block as described above to detect the effect of the flash per block. In addition, by computing an entire amount of sums of differential absolute values computed for each of the blocks, a sum of differential absolute values between the fields can be computed, and thus the evaluation value calculation unit 105 can determine whether a frame is subjected to a flash.

Figure 3B:
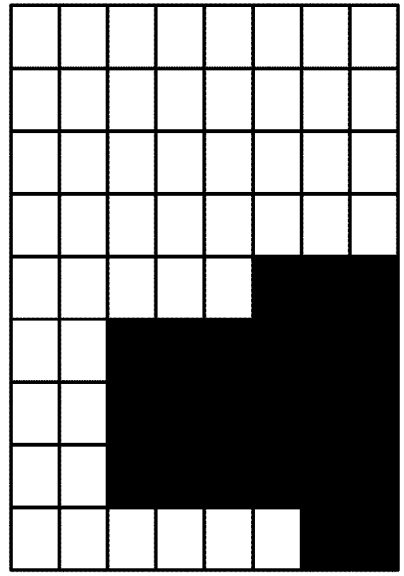
FIG. 3B illustrates a flash detection block according to the first exemplary embodiment of the present invention.
Figure 3A:
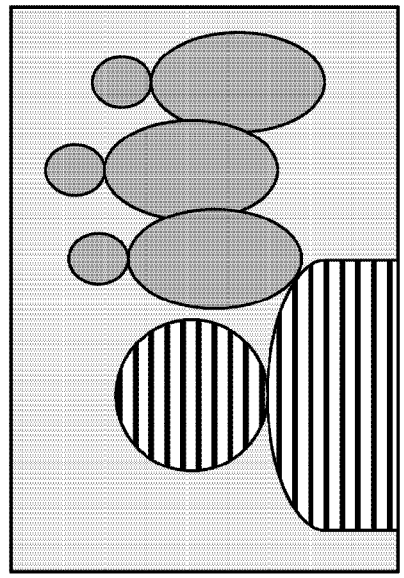
FIG. 3A illustrates an image affected by a flash according to the first exemplary embodiment of the present invention.

FIG. 3A illustrates an image affected by a flash. FIG. 3B illustrates a flash detection block (an area where a flash is detected). An image subjected to a flash of a flashing unit is affected by the flash only on its one field. When an image is subjected to the flash, the image is more intensely affected in a portion located closer to the position of the flashing, while the image is less affected in a portion distant from the flashing position. Accordingly, when only a person positioned in front of other persons is affected by the flash as illustrated in FIG. 3A, blocks overlapping with the person in front of other persons, namely, black blocks illustrated in FIG. 3B, are detected as blocks subjected to the flashing. In the above example according to the present embodiment, the flash detection block includes 24×24 pixels; however, the flash detection block is not limited to this size. That is, a size of a flash detection block can be the same as a macroblock (for example, 16×16 pixels) or can be another size.

If a flash detection block is in the unit of a macroblock, the flash detection block is determined to be a macroblock affected by a flash, as it is. If a flash detection block is not in the unit of a macroblock, it is necessary to specify a macroblock affected by a flash.

Figure 4:
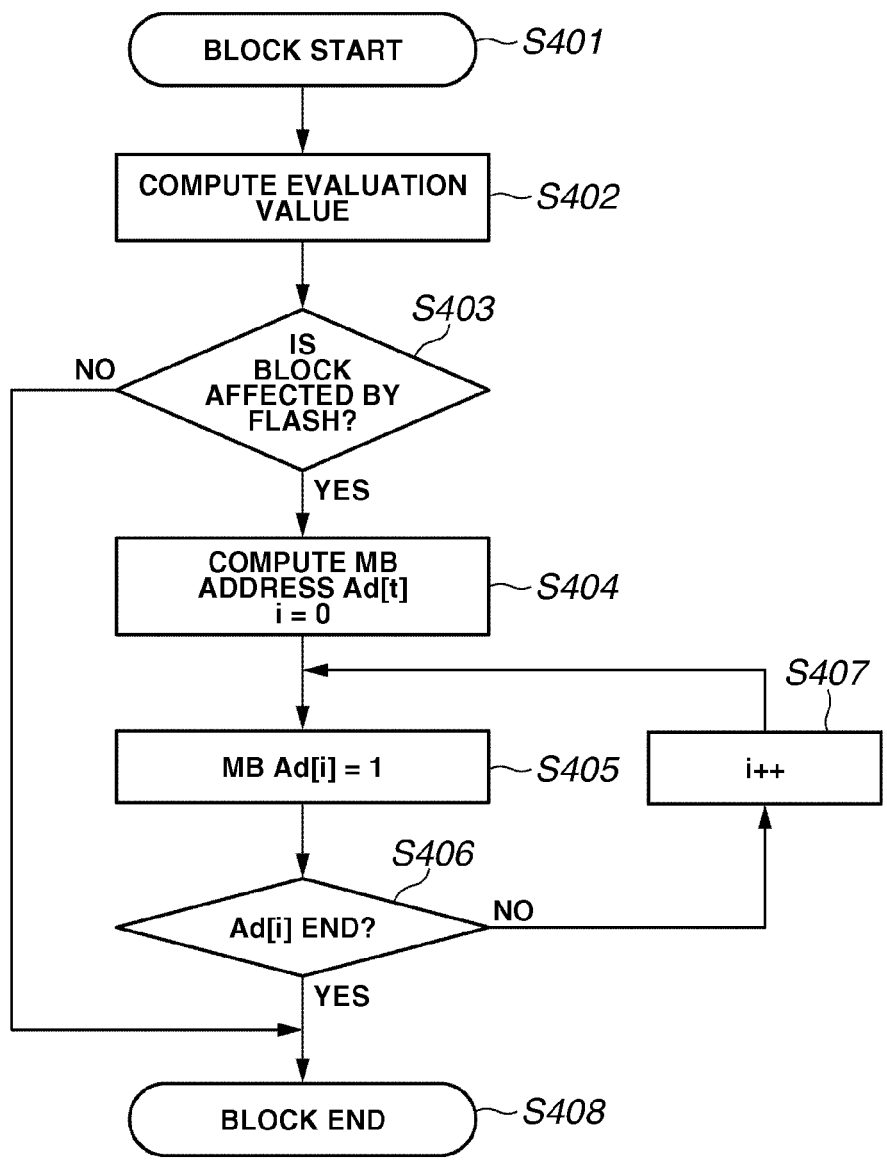
FIG. 4 is a flow chart illustrating a flow of processing for specifying a flash-detected macroblock from the flash detection blocks according to the first exemplary embodiment of the present invention.

FIG. 4 is a flow chart illustrating a flow of processing for specifying a flash-detected macroblock from the flash detection blocks. An operation for detecting a flash per flash detection block, and specifying a macroblock affected by a flash is described with reference to FIG. 4.

As a premise of performing the operation, a flag is provided for each macroblock address. An initial value of the flag is set to "0". The flag is represented as "MB[a]" ("a" refers to a macroblock address).

In step S401, the evaluation value calculation unit 105 performs control per flash detection block. In step S402, the evaluation value calculation unit 105 computes an evaluation value based on data of the flash detection block. In step S403, the camcoder 100 determines whether the block is affected by a flash based on the evaluation value that was output.

If, in step S403, it is determined that the block is affected by a flash (Yes in step S403), then the camcoder 100 determines which macroblock is included in the flash detection block, or which macroblock includes the flash detection block. Then in step S404, the camcoder 100 computes all concerned macroblock addresses and sets a counter i to "0". The addresses computed in step S404 are represented as "Ad[t]" (where "t" represents a number of addresses). In step S405, the camcoder 100 inputs a value "1" to a macroblock flag "MBAd[i]". In step S406, the camcoder 100 determines whether all the concerned macroblock addresses are completely computed.

If, in step S406, it is determined that not all the macroblock addresses are completely computed (No in step S406), then in step S407, the camcoder 100 increments the counter i. After that, the process returns to step S405 to repeat the above-described processing for t addresses.

On the other hand, if, in step S403, it is determined that the block is not affected by a flash (No in step S403), or if, in step S406, it is determined that all the macroblock addresses are completely computed (Yes in step S406), then in step S408, the camcoder 100 ends the processing of the flash detection block. Thus, the macroblock affected by a flash is identified.

FIGS. 6A through 6C illustrate the above-described processing. FIG. 6A illustrates an arrangement of flash detection blocks. FIG. 6B illustrates an arrangement of macroblocks. FIG. 6C illustrates a result obtained by superimposing FIG. 6B onto FIG. 6A. As illustrated by FIGS. 6A through 6C, when a zero-th flash detection block is subjected to a flash, zero-th, first, m-th, and (m+1)th macroblocks are identified as macroblocks affected by the flash.

Returning to FIG. 1, when a type of a picture to be encoded is an I picture, the first switch 106 is flipped to a contact A. Accordingly, the image data output from the picture rearranging unit 104 is input to the DCT unit 107 via the first switch 106 to be orthogonally transformed. At this time, with respect to a macroblock that is determined by the evaluation value calculation unit 105 to have been affected by a flash, the DCT unit 107 compulsorily performs computation as a field DCT.

In the case where a type of a picture to be encoded is a P picture or a B picture, the first switch 106 is flipped to a contact B. The image data output from the picture rearranging unit 104 is subjected to subtraction by the subtracter 114, using prediction image data from the motion compensation prediction unit 113. The subtracter 114 is provided in order to reduce a degree of redundancy in a direction of a time axis.

The image data whose degree of redundancy in the direction of a time axis is reduced by the subtracter 114, is input to the DCT unit 107 via the first switch 106 to be orthogonally transformed. The image data orthogonally transformed by the DCT unit 107 is quantized by the quantization unit 108.

The quantization unit 108 performs quantization using a quantization coefficient output from the quantization coefficient computation unit 118. The quantized image data is input to the dequantization unit 109 and the variable-length encoding unit 115. Furthermore, the image data output from the picture rearranging unit 104 is also input to the motion compensation prediction unit 113.

The quantized image data is dequantized by the dequantization unit 109, and is subjected to an inverse orthogonal transform by the IDCT unit 110. By turning off the second switch 112, the image data subjected to the inverse orthogonal transform is input to the motion compensation prediction unit 113. In order to perform a next inter coding, the motion compensation prediction unit 113 outputs prediction image data using each input data. The prediction image data is supplied to the subtracter 114 and is supplied to the adder 111 by turning on the second switch 112. The adder 111 is used to reconstruct the image data using prediction image data and image data subjected to an inverse orthogonal transform.

The quantized data is input to the variable-length encoding unit 115. Then, the variable-length encoding unit 115 performs a variable-length coding on the input data. Then, the data subjected to the variable-length coding is input to the buffer 116. The image data in the buffer 116 is recorded onto the recording medium 119. The rate control unit 117 computes an amount of data to be encoded based on the image data that is temporarily accumulated in the buffer 116. Rate control of coding is performed according to the amount of data to be encoded. The rate control unit 117 determines a target code amount of a picture to be encoded, based on a given bit rate. The quantization coefficient computation unit 118 computes a quantization coefficient based on the determined target code amount.

Figure 5:
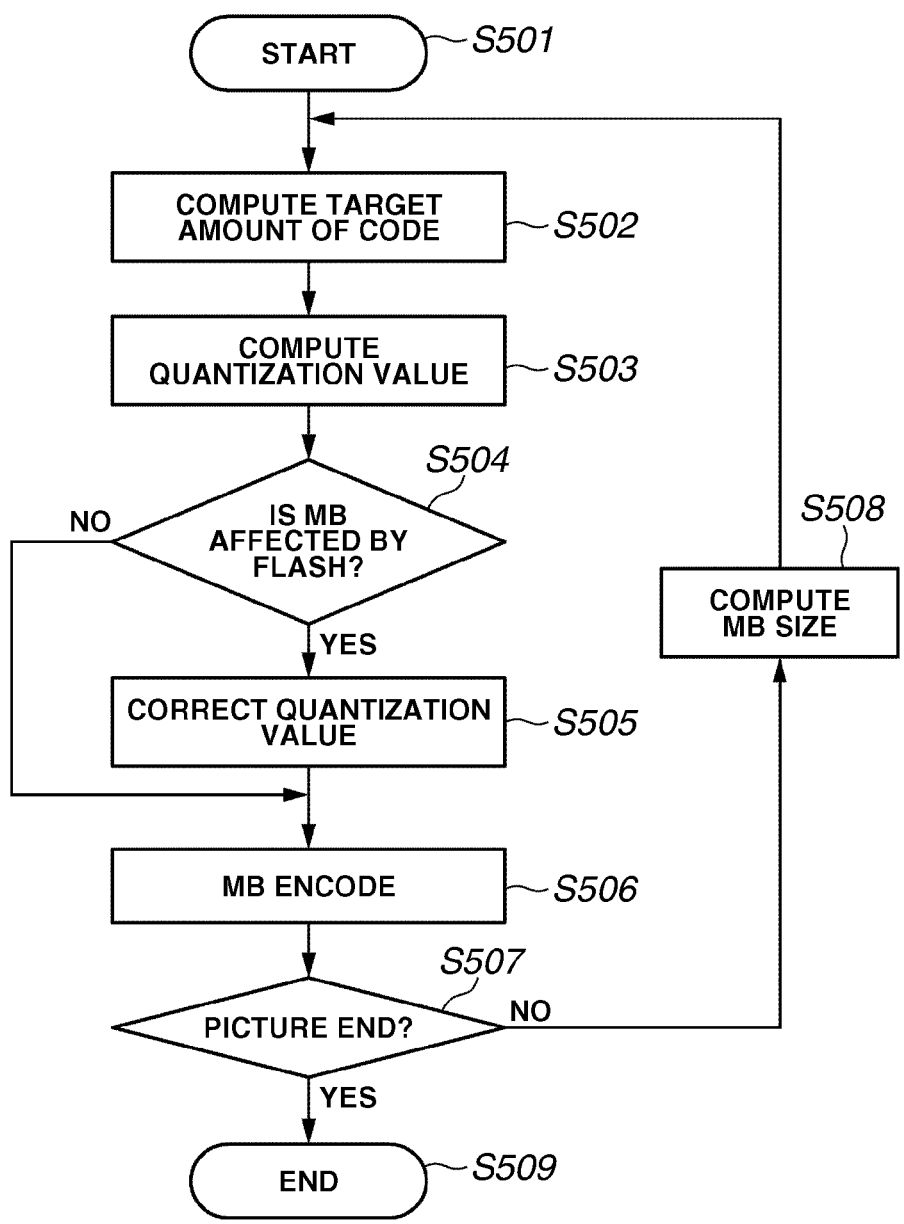
FIG. 5 is a flow chart illustrating a flow of determining a quantization coefficient according to the first exemplary embodiment of the present invention.

FIG. 5 is a flow chart illustrating a flow for determining a quantization coefficient. An operation performed relating to the rate control unit 117 and the quantization coefficient computation unit 118 is described with reference to FIG. 5.

In step S501, the rate control unit 117 and the quantization coefficient computation unit 118 start their operations. In step S502, an amount of remaining target code is divided by a number of remaining macroblocks to compute a target code amount per macroblock. In step S503, the quantization coefficient computation unit 118 computes a next quantization coefficient (Q value) based on the quantization coefficient used thus far and the computed target code amount. In step S504, the camcoder 100 acquires information from the evaluation value calculation unit 105 to determine whether a macroblock provided with the computed quantization coefficient is affected by a flash.

If, in step S504, it is determined that the macroblock provided with the computed quantization coefficient is not affected by a flash (No in step S504), then the processing advances to step S506. On the other hand, if, in step S504, it is determined that the macroblock provided with the computed quantization coefficient is affected by a flash (Yes in step S504), then in step S505, the quantization coefficient computation unit 118 computes a new quantization coefficient again that is smaller than the computed quantization coefficient in order to correct the quantization coefficient (Q value). That is, in order to improve the image quality, the quantization coefficient computation unit 118 performs an adjustment by increasing an amount of allocated code. After that, the process advances to step S506. In step S506, the camcoder 100 encodes the macroblock according to the determined quantization coefficient. In step S507, the camcoder 100 determines whether all the macroblocks in a picture are completely encoded.

If, in step S507, it is determined that not all the macroblocks in a picture are encoded (No in step S507), then in step S508, the camcoder 100 computes a code amount of the macroblock that was last encoded. After that, the process returns to step S502. In step S502, the camcoder 100 subtracts the code amount of the macroblock that was last encoded from the amount of remaining target code computed in the previous processing to acquire a new amount of remaining target code. Then, the camcoder 100 repeats the above processing. On the other hand, if, in step S507, it is determined that all the macroblocks in a picture are completely encoded (Yes in step S507), then in step S509, the camcoder 100 ends the processing.

In the case where the camcoder 100 includes a map of a whole picture whose evaluation value is previously computed, which is illustrated in FIG. 3B, information as to an increase and decrease in the quantization coefficient of a macroblock can be stored in the map. In this case, a correction range of the quantization coefficient can be adjusted according to a number (ratio) of macroblocks affected by a flash in a picture, and information concerning the correction range can be stored in the map.

Furthermore, when quantization coefficients greatly differ from each other across a boundary of a macroblock, a block noise occurs at the boundary. However, data of all the pictures is obtained in advance to coding. Accordingly, the camcoder 100 can perform a correction around a macroblock affected by a flash. As described above, in the present exemplary embodiment, an image quality can be improved by adjusting quantization of a macro block subjected to a rapid luminance change due to a flash, and quantization of macroblocks around such flash-affected macroblock.

Other Exemplary Embodiments

Each unit constituting the image coding apparatus and each step in the image recording method according to the exemplary embodiment of the present invention described above can be implemented by executing a program stored in a random access memory (RAM) and a read only memory (ROM) of a computer.

In addition, the present invention can be implemented by an exemplary embodiment configured as a system, an apparatus, a method, a program, or a storage medium. More specifically, the present invention can be applied to a system including a plurality of devices or to an apparatus including a single device.

The present invention can be implemented by directly supplying program code (program code corresponding to each of the flow charts illustrated in FIG. 4 and FIG. 5 in the exemplary embodiment of the present invention) of software implementing functions of the above-described exemplary embodiment, to a system or an apparatus. Further, the present invention can be achieved by remotely supplying program code to a system or an apparatus and by reading and executing the program code using a computer of the system or the device (a central processing unit (CPU) or a micro processing unit (MPU)).

Accordingly, the program code itself, which is installed to the computer in order to implement the functional processing of the present invention, implements the function of the exemplary embodiment mentioned above.

In this case, the program can be configured in any form, such as object code, a program executed by an interpreter, and script data supplied to an operating system (OS).

As the storage medium for supplying such program code, for example, a floppy disk, a hard disk, an optical disk, a magneto-optical (MO) disk, a CD-ROM, a CD-R, a CD-RW, a magnetic tape, a nonvolatile memory card, a ROM, a DVD, a DVD-ROM, and a DVD-R can be used.

The above program can also be supplied by connecting to a web site on the Internet using a browser of a client computer and by downloading the computer program of the present invention from the web site. In addition, the above program can also be supplied by downloading a compressed file that includes an automatic installation function from the web site to a recording medium such as a hard disk.

The functions of the above exemplary embodiment can also be implemented by dividing the program code into a plurality of files and downloading each divided file from different web sites. That is, the present invention can also be applied to a World Wide Web (WWW) server that allows a plurality of users to download the program file for implementing the functional processing of the present invention in a computer.

In addition, the above program can also be supplied by distributing a storage medium such as a CD-ROM and the like which stores the program according to the present invention after an encryption thereof. In this case, the authorized users (i.e., users satisfying predetermined conditions) are allowed to download key information for decoding the encryption from the web site via the Internet. The users can decipher the programs using the key information and can install the programs on their computers.

In addition, the functions according to the exemplary embodiment described above can be implemented not only by executing the program code read by the computer, but also implemented by the processing in which an OS or the like carries out a part of or the whole of the actual processing based on an instruction given by the program code.

Further, in another aspect of the exemplary embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the exemplary embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

An above embodiment described a method to detect a luminance change by a difference between consecutive field images, but the present invention can be realized by a difference between consecutive frame images similarly.

What is claimed is:

1. An apparatus comprising:
a hardware processor; and
a memory, the memory storing instructions for:
a coding unit configured to encode first blocks obtained from one picture included in moving image data; and
a code amount adjustment unit configured to increase an amount of code allocated to the first block if the first block corresponds to a luminance change block,
wherein the code amount adjustment unit includes:
a rate control unit; and
a quantization coefficient setting unit configured to set a quantization coefficient per first block according to a target code amount determined by the rate control unit, and to change a value of the coefficient so that the quantization coefficient becomes smaller if the first block corresponds to the luminance change block.

2. The apparatus according to claim 1, further comprising a detection unit configured to detect, from one picture, a luminance change block in which a luminance change occurred.

3. The apparatus according to claim 1, further comprising:
a calculation unit configured to calculate evaluation values using field images composing one picture; and
a detection unit configured to detect a luminance change block using the calculated evaluation values.

4. The apparatus according to claim 1, wherein further comprising a detection unit configured to detect, from the moving image data, a luminance change block affected by a flash.

5. The apparatus according to claim 1, further comprising a detection unit configured to divide one picture included in the moving image data into second block, and configured to detect, using the second blocks, a luminance change block in which a luminance change occurred,
wherein a size of the second block is same or larger than a size of the first block.

6. A method comprising:
encoding, by a computing device, first blocks obtained from one picture included in moving image data;
increasing an amount of code allocated to the first block if the first block corresponds to a luminance change block;
setting a quantization coefficient per first block according to a target code amount determined by a rate control; and
changing a value of the coefficient so that the quantization coefficient becomes smaller if the first block corresponds to the luminance change block.

7. The method according to claim 6, further comprising detecting, from one picture, a luminance change block in which a luminance change occurred.

8. The method according to claim 6, further comprising:
calculating evaluation values using field images composing one picture; and
detecting a luminance change block using the calculated evaluation values.

9. The method according to claim 6, further comprising:
dividing one picture included in the moving image data into second blocks; and
detecting, using the second blocks, a luminance change block in which a luminance change occurred,
wherein a size of the second block is same or larger than a size of the first block.

10. The method according to claim 6, further comprising detecting, from the moving image data, a luminance change block affected by a flash.

11. A non-transitory computer-readable storage medium that stores computer-executable instructions for causing a computer to perform a method, the method comprising:
encoding first blocks obtained from one picture included in moving image data;
increasing an amount of code allocated to the first block if the first block corresponds to a luminance change block;
setting a quantization coefficient per first block according to a target code amount determined by a rate control; and
changing a value of the coefficient so that the quantization coefficient becomes smaller if the first block corresponds to the luminance change block.

12. An apparatus comprising:
a memory that stores image data;
a determination unit that determines whether a target block included in the image data satisfies a predetermined condition, using a sum of pixel values included in a first field of the image data and a sum of pixel values included in a second field of the image data, wherein the target block satisfies the predetermined condition if the target block corresponds to a block affected by a flash; and
a quantization unit that processes the target block using a first quantization coefficient if the target block does not satisfy the predetermined condition, and processes the target block using a second quantization coefficient which is smaller than the first quantization coefficient if the target block satisfies the predetermined condition.

13. The apparatus according to claim 12, further comprising:
a calculating unit that calculates the first quantization coefficient if the target block does not satisfy the predetermined condition, and calculates the second quantization coefficient which is smaller than the first quantization coefficient if the target block satisfies the predetermined condition.

14. The apparatus according to claim 12, further comprising:
a control unit that determines a target code amount, wherein the first quantization coefficient is calculated using the target code amount.

15. The apparatus according to claim 12, further comprising:
an image capture unit that captures an image; and
a generating unit that generates the image data including the target block from the captured image.

16. The apparatus according to claim 12, wherein the apparatus acts as an image capture apparatus.

17. The apparatus according to claim 12, wherein the target block includes a macroblock.

18. A method comprising:
causing a memory to store image data;
determining whether a target block included in the image data satisfies a predetermined condition, using a sum of pixel values included in a first field of the image data and a sum of pixel values included in a second field of the image data, wherein the target block satisfies the predetermined condition if the target block corresponds to a block affected by a flash;
processing the target block using a first quantization coefficient if the target block does not satisfy the predetermined condition; and
processing the target block using a second quantization coefficient which is smaller than the first quantization coefficient if the target block satisfies the predetermined condition.

19. The method according to claim 18, further comprising:
calculating the first quantization coefficient if the target block does not satisfy the predetermined condition; and
calculating the second quantization coefficient which is smaller than the first quantization coefficient if the target block satisfies the predetermined condition.

20. The method according to claim 18, further comprising:
determining a target code amount, wherein the first quantization coefficient is calculated using the target code amount.

21. The method according to claim 18, further comprising:
causing an image capture unit to capture an image; and
causing a generating unit to generate the image data including the target block from the captured image.

22. The method according to claim 18, wherein the method is applied to an image capture apparatus.

23. The method according to claim 18, wherein the target block includes a macroblock.

24. A non-transitory computer-readable storage medium that stores a program for causing a computer to execute a method, the method comprising:
causing a memory to store image data;
determining whether a target block included in the image data satisfies a predetermined condition, using a sum of pixel values included in a first field of the image data and a sum of pixel values included in a second field of the image data, wherein the target block satisfies the predetermined condition if the target block corresponds to a block affected by a flash;
processing the target block using a first quantization coefficient if the target block does not satisfy the predetermined condition; and
processing the target block using a second quantization coefficient which is smaller than the first quantization coefficient if the target block satisfies the predetermined condition.

* * * * *